United States Patent [19]
Boek et al.

[11] Patent Number: 5,108,960
[45] Date of Patent: Apr. 28, 1992

[54] GLASSES FOR CATHODE RAY TUBE FACEPLATES

[75] Inventors: Heather Boek; George B. Hares, both of Corning, N.Y.

[73] Assignee: Corning Incorporated, Corning, N.Y.

[21] Appl. No.: 654,529

[22] Filed: Feb. 13, 1991

[51] Int. Cl.$^5$ .................. C03C 3/095; C03C 4/08
[52] U.S. Cl. .................. 501/64; 252/478; 313/480
[58] Field of Search .......... 501/64; 313/480; 252/478

[56] References Cited

U.S. PATENT DOCUMENTS

| | | | |
|---|---|---|---|
| 4,015,966 | 4/1977 | Weaver | 501/64 |
| 4,331,770 | 5/1982 | Thompson | 501/64 |
| 4,337,410 | 6/1982 | Van der Geer et al. | 501/64 |
| 4,376,829 | 3/1983 | Daiku | 501/64 |
| 4,390,637 | 6/1983 | Daiku | 501/64 |
| 4,734,388 | 3/1988 | Cameron et al. | 501/64 |
| 4,830,990 | 5/1989 | Connelly | 501/64 |

*Primary Examiner*—Mark L. Bell
*Attorney, Agent, or Firm*—Milton M. Peterson; Clinton S. Janes, Jr.

[57] ABSTRACT

A cathode ray tube faceplate glass that is essentially free from fluorine and the oxides of lead arsenic and zirconium, exhibits linear X-radiation absorption coefficients of at least 28 cm$^{-1}$ at a wavelength of 0.6 Angstroms and at least 8.5 cm$^{-1}$ at 0.3 Angstroms, undergoes essentially no "browning" discoloration when subjected to high velocity electrons, has a viscosity at the internal liquidus of at least 100,000 poises (10,000 Pa.s), has a coefficient of thermal expansion (25°–300° C.) in the range of 97–100×10-7/° C., has an annealing point not lower than about 500° C. and a strain point not lower than about 455° C., has an electrical resistivity expressed in log R, that is greater than 9 at 250° C. and greater than 7 at 350° C., the glass consisting essentially, expressed in terms of weight percent as oxide basis, of

| | | | |
|---|---|---|---|
| SiO$_2$ | 60–65 | SrO | 8–12 |
| Al$_2$O$_3$ | 0–3 | BaO | 8–12 |
| Na$_2$O | 6.5–8 | BaO + SrO | 16–21 |
| K$_2$O | 6.5–10 | ZnO | 1–8 |
| CaO + MgO | 0–3 | CeO$_2$ | 0.1–1 |
| Sb$_2$O$_3$ | 0.1–1 | TiO$_2$ | 0.1–1 |

10 Claims, 1 Drawing Sheet

—— SrO
---- BaO

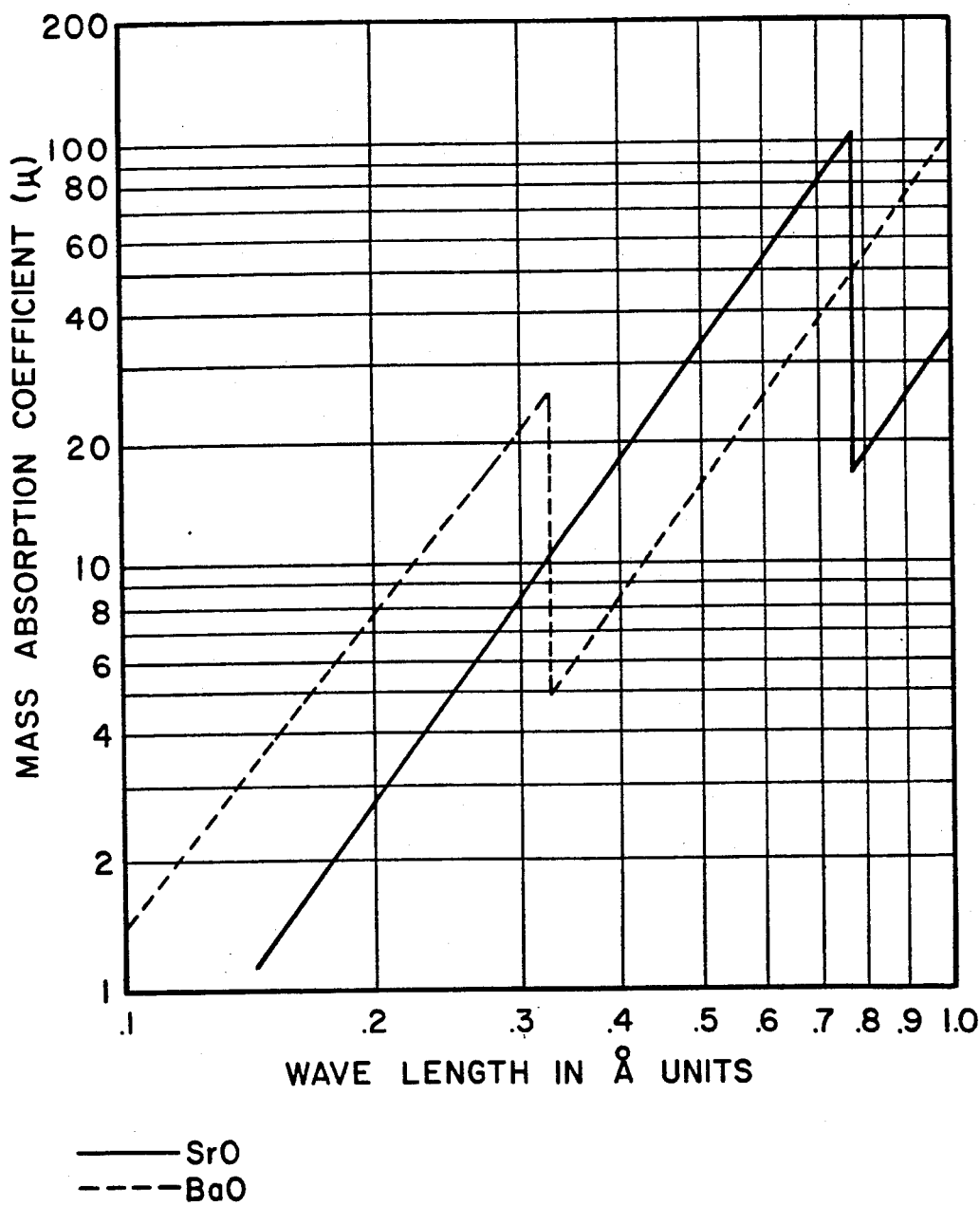

GLASSES FOR CATHODE RAY TUBE FACEPLATES

FIELD OF THE INVENTION

The field is compositions for glasses used in cathode ray tube faceplates and, in particular, in faceplates for color television picture tubes.

BACKGROUND OF THE INVENTION

The faceplate for a cathode ray tube of the type used in television picture tubes is fabricated from a transparent glass exhibiting a matrix of physical properties mandated by the process for manufacturing cathode ray tubes. The glass must also demonstrate a high degree of X-radiation absorption and resist discoloration (termed "browning" in the art) caused by the bombardment of high velocity electrons thereupon and exposure to X-radiation.

The concerns regarding X-radiation absorption have increased as voltages applied at the anode have been raised by the television picture tube manufacturers. Thus, as the voltage at the anode is raised, the electron beam generated from the cathode is further accelerated. The beam strikes and penetrates the aluminum film, the phosphor screen, and the faceplate of the tube emitting X-radiation. As can be appreciated then, the higher the voltage applied, the greater the need for X-radiation absorption by the faceplate glass. Hence, whereas in the past a glass possessing an X-radiation absorption coefficient of 26 cm$^{-1}$ at a wavelength of 0.6 Angstroms was deemed to be quite satisfactory, it is now adjudged that the coefficient at 0.6 Angstroms should be raised to at least 28 cm$^{-1}$.

In recent years, the trend has been to use higher and higher anode voltages in commercial television tubes. In fact, some tubes now use voltages of 40 KV or higher. As the voltage increases, the short wavelength end of the X-radiation range decreases. To illustrate, the short wavelength limit for 30 KV is 0.41 Angstroms; that for 40 KV is 0.31 Angstroms. Thus, it now becomes desirable to have the absorption as high as possible at 0.3 Angstroms, while still maintaining the industry standard of a minimum linear absorption coefficient ($\mu$) of 28 cm$^{-1}$ at 0.6 Angstroms. A linear absorption coefficient of at least 8.5 cm$^{-1}$ at 0.3 Angstroms is desirable.

Although the utility of lead oxide in absorbing X-radiation is well known to the art, the presence of lead oxide in a glass may result in permanent "browning" of the glass when it is subjected to electron bombardment. De Gier et al., in U.S. Pat. No. 2,477,329, observed that browning of a glass resulting from the bombardment of electrons could be essentially avoided by eliminating the presence of readily reducible oxides, particularly lead oxide, from the glass composition. The patent also notes that such discoloration of glasses by X-radiation could be reduced by including $CeO_2$ in the glass composition.

U.S. Pat. No. 3,464,932 (Connelly et al.) discusses alternative means for obtaining glasses displaying high X-radiation absorption coefficients. The patent observes that the final value demonstrated by a glass results from a combination of the mass absorption coefficients of the individual constituents of the glass composition. Hence, to secure glasses exhibiting desired high X-radiation absorption coefficients requires the use of components possessing high mass absorption coefficients. The patent is particularly concerned with the relative merits of SrO and BaO for absorbing X-radiation in the wavelength range of interest between 0.35 and 0.77 Angstroms.

However, as was noted above, in addition to providing X-radiation absorption, and being resistant to discoloration from impingement of X-radiation and high velocity electrons, the faceplate glass must also satisfy an extensive matrix of physical properties. To illustrate:

First, the glass must exhibit a linear coefficient of thermal expansion (25°-300° C.) between 97-100 $\times 10^{-7}$/° C.;

Second, the glass must possess an annealing point not lower than about 500° C., and a strain point not lower than about 455° C.;

Third, the glass must demonstrate an electrical resistivity (log R) greater than 9 at 250° C. and greater than 7 at 350° C., and Fourth, the glass must exhibit a viscosity at the liquidus temperature of at least 100,000 poises (10,000 Pa.s).

In recent years, the glass manufacturer has been confronted with ever increasing restrictions on the use of materials contributing to environmental pollution. For example, a fluoride-containing material has frequently been employed to provide an additional fluxing agent to improve the melting capability of a glass. Also, arsenic has traditionally been utilized to eliminate bubbles that occur in a glass during the melting process. Unfortunately, volatilization of fluorine and arsenic during the batch melting process results in air pollution problems. Consequently, the glass manufacturer has moved to eliminate the use of arsenic and fluoride-containing materials as batch materials.

Glass compositions for the fabrication of faceplates for television picture tubes essentially free of lead, arsenic and fluorine have been, and are, marketed commercially. In order to maintain the necessary level of X-radiation absorption, zirconia has commonly been incorporated in these glass compositions in substitution for lead.

Unfortunately, these zirconia-containing glasses have been found to be much more difficult to melt. The removal of lead oxide and fluorine retards the rate of melting. The removal of arsenic oxide decreases the fining rate, thus requiring a longer time to render the glass free of gaseous inclusions. Also the solution of zircon (batch source of zirconia) is slow. This gives rise to unmelted batch as well as an increase in the number of gaseous inclusions in the glass.

As a result, in order to obtain high quality glass, it becomes necessary to either increase the melting temperature of the glass, or increase the time at which the glass is held at the melting temperature. Either of these measures decreases the amount of glass that can be produced over a given period of time. As can be appreciated, both alternatives increase the overall production costs of the glass.

PURPOSES OF THE INVENTION

A basic purpose is to provide a family of glasses having properties that make them particularly useful in producing cathode ray tube faceplates for color television picture tubes.

A further purpose is to provide glasses that have linear X-ray absorption coefficients of at least 28 cm$^{-1}$ at 0.6 Angstroms and at least 8.5 cm$^{-1}$ at 0.3 Angstroms, and that resist "browning" from high velocity electron impingement.

Another purpose is to provide glasses that will melt easily to yield essentially inclusion-free glass at a high output rate.

A still further purpose is to provide glasses that have a viscosity of at least 100,000 poises (10,000 Pa.s) at the liquidus temperature. For glasses which satisfy the above physical property requirements, the temperature is at least 875° C., when the glass has a viscosity of 100,0000 poises.

A specific purpose is to provide a family of glasses in which fluorine and the oxides of lead, arsenic and zirconium, are excluded from, and $Al_2O_3$, CaO and MgO are minimized in, the glass compositions.

SUMMARY OF THE INVENTION

To these and other apparent ends, our invention resides in a family of glasses that are essentially free from fluorine, and oxides of arsenic, zirconium and lead, that exhibit linear X-radiation absorption coefficients of at least 28 cm$^{-1}$ at a wavelength of 0.6 Angstroms and at least 8.5 cm$^{-1}$ at 0.3 Angstroms, that undergo essentially no discoloration when subjected to high velocity electrons, that have a viscosity of at least 100,000 poises (10,000 Pa.s) at the liquidus temperature, that are easily melted, that have a coefficient of thermal expansion (25°-300° C.) in the range of 97-100×10$^{-7}$/° C., that have an annealing point not lower than about 500° C. and a strain point not lower than about 455° C., that have an electrical resistivity (log R) greater than 9 at 250° C. and greater than 7 at 350° C. and that have a composition consisting essentially of, as calculated in weight percent on the oxide basis from the glass batch,

| | | | |
|---|---|---|---|
| $SiO_2$ | 60-65 | SrO | 8-12 |
| $Al_2O_3$ | 0-3 | BaO | 8-12 |
| $K_2O$ | 6.5-10 | BaO + SrO | 16-21 |
| $Na_2O$ | 6.5-8 | CaO + MgO | 0-3 |
| ZnO | 1-8 | $TiO_2$ | 0.1-1 |
| $CeO_2$ | 0.1-1 | | |

Optionally, the composition may include small amounts of known faceplate glass colorants, such as $Co_3O_4$, $Cr_2O_3$ and/or NiO, and a fining agent, such as $Sb_2O_3$.

Our invention further contemplates a cathode ray tube faceplate formed from a glass according to the invention.

BRIEF DESCRIPTION OF THE DRAWING

The single FIGURE of the drawing graphically depicts the mass absorption coefficients of BaO and SrO for X-radiation at wavelengths between 0.1 and 1.0 Angstroms, as well as the K absorption edges for each oxide.

PRIOR ART

In addition to the de Gier and Connelly et al. patents already noted, a number of other patents exist in the art disclosing glasses particularly adapted to production of faceplates for cathode ray tubes.

Among these are U.S. Pat. Nos. 3,805,107 (Boyd), No. 4,734,388 (Cameron et al.) and No. 4,830,990 (Connelly), Japanese Publication 1978-113813 and European Publication 0,131,399 B1. These patents and publications variously teach the exclusion of one or more of the known glass constituents fluorine and the oxides of arsenic, lead and magnesium. In lieu thereof, they may include $ZrO_2$ and/or $Li_2O$, both of which are excluded from the present glasses.

U.S. Pat. No. 4,277,286 (Boyd et al.) teaches glasses containing a combination of barium, strontium, zinc and zirconium oxides for linear X-ray absorption, the ZnO content being 5-12%. However, the Connelly patent (−990) noted above teaches that ZnO contributes to browning and must be excluded.

Also somewhat related are U.S. Pat. Nos. 4,015,966 (Weaver) and No. 4,337,410 (Van der Gier et al.) The former teaches avoiding oxides of lead and arsenic and other readily reducible oxides in making X-ray glass by the float process. The latter teaches excluding F, but including $ZrO_2$, and does not mention ZnO.

GENERAL DESCRIPTION OF THE INVENTION

A principal aspect of our invention is a family of glasses that is defined by narrow composition ranges and by specific physical characteristics that prevail within those ranges. The definition of our glass family represents the culmination of an extensive glass composition study. It is based on certain surprising relationships between glass components and properties that the study revealed.

The relationships which we discovered, and which form the basis of our invention, may be summarized as follows:

1. The presence of zirconia ($ZrO_2$) in a glass of our composition family makes commercial melting of the glass much more difficult, and hence severely limits the melting rate.

2. Zinc oxide (ZnO) can be employed in conjunction with baria (BaO) and strontia (SrO) to provide a desired level of X-ray absorption without impairing glass melting; that is, without reducing the throughput of essentially inclusion-free glass. Inclusions are solid particles, striations and gaseous inclusions (seeds or bubbles) that are visually apparent and interfere with picture transmission.

3. At least 1% zinc oxide (ZnO) is generally necessary to provide a glass having a viscosity at the liquidus of 100,000 poises or greater.

4. Except for glasses with certain specific BaO:SrO ratios, the presence of alumina ($Al_2O_3$) in a glass has little positive effect on the internal liquidus temperature of the glass, and as little as 2% may be detrimental depending on the BaO and SrO contents.

5. The presence of both BaO and SrO, as well as their combined content, in our glasses is very important for X-radiation absorption purposes, particularly at high voltages.

As noted in the PRIOR ART section, it has been proposed to replace PbO, as an X-radiation absorber in cathode ray tube faceplate glass, by a combination of SrO, BaO and $ZrO_2$. This has provided the necessary X-ray absorption level, while avoiding discoloration due to the presence of lead. However, the use of zirconia has also proven very detrimental by severely limiting the throughput of essentially inclusion-free glass in commercial melting units. Not only is the melting rate retarded by the presence of $ZrO_2$, but the dissolution of zircon (the source of $ZrO_2$) is slow. This gives rise to unmelted batch particles, as well as gaseous inclusions, in the glass. In addition, the removal of arsenic decreases the fining rate, thereby increasing the time required to free the glass of gaseous inclusions. As a consequence, it became necessary, in order to obtain good quality glass, to either decrease the amount of glass production per melting unit, or enhance the melting unit size. Accordingly, a feature of our present glasses is avoidance of lead oxide, zirconia and arsenic oxide.

A further feature of our glasses is the inclusion in the compositions of at least 1% ZnO. This is necessary to provide a viscosity at the liquidus of 100,000 poises in our glasses. Furthermore, as taught in U.S. Pat. No. 4,277,286 (Boyd et al.), ZnO is an effective X-radiation absorber. Subsequent to the proposed use of ZnO by Boyd et al., such use has been discouraged. Thus, U.S. Pat. Nos. 4,376,829 and No. 4,390,637 suggest that ZnO interferes with glass melting and should be avoided, at least in amounts over 3%. Also, U.S. Pat. No. 4,830,990 (Connelly) warns that ZnO must be omitted from the Boyd et al. glasses to insure against browning.

It was most surprising then to find that ZnO not only could be used to obtain a low internal liquidus, but actually improved the melting of our compositions having high BaO and SrO contents. This permits us to exclude the hitherto used fluoride and arsenic from our compositions, while achieving a desired high throughput of essentially inclusion-free glass and maintaining other necessary properties.

It was also surprising to find that a quantitative measurement of electron browning showed that the browning of one of our glasses containing 2.5% ZnO was no greater than a commercial composition that contained neither lead nor zinc oxide.

Zinc oxide is a relatively expensive raw material, particularly when compared to barium and strontium carbonates. Thus, it is desirable, from a purely economic standpoint, to minimize the ZnO content, and maximize the dependence on BaO and SrO for x-ray absorption.

To this end, we have found that proper adjustment of the BaO:SrO ratio, as well as their total content, in our glasses permits utilizing these oxides within the indicated ranges, and thereby minimizing the amount of ZnO required to provide the prescribed properties. In particular, we find that a substantial excess of either BaO or SrO, relative to the other oxide, is undesirable.

Accordingly, our glasses require 8–12% each of BaO and SrO, and a combined BaO+SrO content of 16–21%. This balance has been found necessary primarily to provide the required X-radiation absorption at both the 0.3 Angstroms and the 0.6 Angstroms wavelengths, as explained earlier. The need for the balance may be better seen by reference to the appended drawing. The drawing graphically depicts the mass absorption coefficients of BaO and SrO at wavelengths between 0.1 and 1.0 Angstroms, as well as K absorption edges for each oxide. X-radiation wavelengths, in Angstroms, are plotted on the horizontal line, whereas mass absorption coefficients are plotted on the vertical axis. The dashed curve represents coefficients for BaO, and the solid line represents coefficients for SrO.

For each element, there are a number of characteristic wavelengths at which the mass absorption coefficient undergoes a marked decrease for a slight increase in wavelength. This wavelength is called a critical absorption wavelength, or absorption edge, for the element. These absorption edges are related to the characteristic X-ray emission lines of the elements. The wavelength of the absorption edge corresponds to the smallest quantum required to excite the characteristic line associated with the edge.

The characteristic emission lines are related to electron energy transfer within the atom. The spectra are designated by the letters, K, L, M, N and O. The K energy level is the most vital. For strontium, the K absorption edge is at 0.77 Angstroms, while for barium the K absorption edge is at 0.33 Angstroms. This results in the mass absorption coefficient of strontia being greater than baria between these two wavelengths.

However, below 0.33 Angstroms, and hence at 0.30 Angstroms, the situation is reversed. Here, BaO becomes the more powerful absorber. Hence, the levels of BaO and SrO need to be balanced in order to achieve a desired level of absorption at both the 0.3 Angstroms wavelength and the 0.6 Angstroms wavelength.

In glass technology, it has been conventional wisdom that replacement of some of the silica by alumina in a silicate glass composition would lower the liquidus temperature of the glass. Accordingly, many glasses have two or more percent of alumina in their composition for this purpose. The practice is supported by findings reported in a 1948 publication, *Journal of American Ceramic Society* 31, 1–8 (1948). This paper, based on studies of $Na_2O$-$SrO$-$Al_2O_3$-$SiO_2$ glasses, reports that the liquidus temperature continually decreases as $Al_2O_3$ is substituted for $SiO_2$, at least up to a 4 percent by weight substitution.

Contrary to this teaching and prior practice, our studies have indicated that, except for certain specific BaO:SrO ratios near 1:1, the addition of alumina has little effect on lowering the liquidus temperature. Furthermore, a substitution of as little as 2 wt. percent alumina for silica may have a very detrimental effect on the liquidus temperature, depending on the BaO:SrO ratio.

While lithia ($Li_2O$) aids in melting, it tends to lower the annealing and strain points of a glass. Its use is preferably avoided in our glasses.

The substitution of lime (CaO) and/or magnesia (MgO) in our glasses tends to raise the strain point of the glasses. However, such substitution also raises the liquidus temperature, and thus increases the risk of devitrification. Therefore, our glasses are limited to a maximum of about 3% CaO and/or MgO.

In summary then, our present glass family is defined by the following oxide ranges in percent by weight:

| | | | |
|---|---|---|---|
| $SiO_2$ | 60–65 | SrO | 8–12 |
| $Al_2O_3$ | 0–3 | BaO | 8–12 |
| $Na_2O$ | 6.5–8 | BaO + SrO | 16–21 |
| $K_2O$ | 6.5–10 | CaO + MgO | 0–3 |
| ZnO | 1–8 | $CeO_2$ | 0.1–1 |
| $Sb_2O_3$ | 0.1–1 | $TiO_2$ | 0.1–1 |

The oxides of Sr, Ba and Zn serve to provide the required linear X-radiation coefficient and permit exclusion of PbO. The ZnO is further required to maintain a viscosity at the liquidus temperature of at least 100,000 poises. The oxides of Sr and Ba are employed at rather high levels to provide adequate X-ray absorption and low liquidus with a minimum addition of expensive ZnO.

Alumina, which is optional, may be present in a limited amount because of its adverse effect on liquidus. The alkalies, $Na_2O$ and $K_2O$, serve their normal functions of flux oxides to facilitate melting and to control the electrical resistivity. In conjunction with zinc oxide, these alkalies facilitate melting and permit the exclusion of lithia ($Li_2O$) and fluorine.

Ceria ($CeO_2$) is present for the known purpose of preventing "browning" due to X-radiation. Titania ($TiO_2$) is present to prevent solarization from ultraviolet sources. Small amounts of glass colorants, cobalt oxide ($Co_3O_4$), nickel oxide (NiO), and/or chromium oxide ($Cr_2O_3$), may be added in known manner to provide a neutral gray tint. Finally, we use antimony oxide ($Sb_2O_3$) as a fining agent in substitution for arsenic oxide.

Materials containing lead, fluorine, zirconium, and/or arsenic are preferably completely avoided as batch constituents. However, the use of recycled tubes, as a source of cullet, is being seriously considered in order to minimize landfill problems. Accordingly, we foresee the possible necessity of using foreign cullet, that is, cullet from sources other than our glasses, and hence containing the materials noted as undesirable. Thus, while we prefer to avoid such use, the necessity of tolerating one or more of these materials, as impurities, in amounts up to a half percent or so, is contemplated.

DESCRIPTION OF SPECIFIC EMBODIMENTS

TABLE I presents a number of glass compositions, expressed in terms of parts by weight on the oxide basis, illustrating the parameters of the present invention. Inasmuch as the sum of the individual components totals, or very closely approximates, 100, for all practical purposes each of the recorded values may be deemed to reflect weight percent. The actual batch ingredients may comprise any materials, either oxides or other compounds, which, when melted together, will be converted into the desired oxides in the proper proportions.

The batch constituents were vigorously mixed together to assist in securing a homogeneous melt. The batches were then placed in platinum crucibles, and the crucibles were introduced into a furnace operating at about 1500° C. After melting for about four hours with occasional stirring, the melts were poured into steel molds to form glass slabs having dimensions of about $4'' \times 10'' \times 1''$. The slabs were transferred immediately to an annealer operating at about 525° C.

Whereas the above description reflects laboratory practice, it will be appreciated that the compositions recited in TABLE I could be melted and formed in much larger quantities employing conventional commercial melting units and glass forming techniques. $Sb_2O_3$ was included in the batches to perform its function as a fining agent. Also, on the order of 0.002% cobalt oxide and 0.014% nickel oxide were included in compositions for known colorant purposes.

Specimens were cut from the annealed glass slabs, and electrical and physical properties were measured on those specimens by techniques conventional in the glass art. The data thus obtained are also recorded in TABLE I. The softening point (Soft), annealing point (Ann), and strain point (Str) are reported in ° C.; the linear coefficient of thermal expansion over the 25°–300° C. interval (Exp) is recorded in terms of $\times 10^{-7}/°$ C.; the density (Dens.) in gms/cc; the electrical resistivities, measured at 350° C. and 250° C., are expressed in terms of log R 250 and log R 350, respectively. Calculated linear X-ray absorption coefficients ($\mu$) at 0.3 and 0.6 Angstroms are expresed in $cm^{-1}$. The internal liquidus temperatures (Liq) are expressed in ° C. The approximate viscosity (Visc.) at the internal liquidus is expressed both as poises (P) and Pascal-seconds (Pa.s), and is obtained from the appropriate viscosity-temperature plots.

TABLE I

|  | 1 | 2 | 3 | 4 | 5 | 6 |
|---|---|---|---|---|---|---|
| $SiO_2$ | 61.9 | 61.2 | 59.9 | 60.9 | 63.4 | 61.7 |
| $Al_2O_3$ | 1.0 | 1.0 | 2.0 | 2.0 | 0.5 | 1.0 |
| $K_2O$ | 7.0 | 7.0 | 7.0 | 7.0 | 6.9 | 7.0 |
| $Na_2O$ | 7.6 | 7.6 | 7.6 | 7.6 | 7.3 | 7.5 |
| SrO | 9.7 | 9.2 | 8.7 | 9.7 | 10.2 | 9.2 |
| BaO | 9.5 | 10.5 | 11.5 | 9.5 | 9.15 | 10.5 |
| ZnO | 2.0 | 2.2 | 2.0 | 2.0 | 1.25 | 1.75 |
| CaO | 0 | 0 | 0.2 | 0.2 | 0 | 0 |
| $CeO_2$ | 0.3 | 0.3 | 0.3 | 0.3 | 0.3 | 0.3 |
| $TiO_2$ | 0.5 | 0.5 | 0.5 | 0.4 | 0.5 | 0.5 |
| $Sb_2O_3$ | 0.4 | 0.4 | 0.4 | 0.5 | 0.4 | 0.4 |
| $Co_3O_4$ | 0.0018 | 0.0018 | 0.0018 | 0.0018 | 0.0018 | 0.0018 |
| NiO | 0.0137 | 0.0137 | 0.0137 | 0.0137 | 0.0137 | 0.0137 |
| Soft | 682 | 683 | 688 | 691 | 687 | 683 |
| Ann | 501 | 500 | 504 | 507 | 501 | 498 |
| Str | 457 | 457 | 460 | 463 | 458 | 456 |
| Exp | 98.5 | 99.1 | 99.1 | 98.7 | 97.3 | 99.9 |
| Dens | 2.781 | 2.805 | 2.812 | 2.787 | 2.755 | 2.792 |
| $\mu$(0.3) | 9.3 | 10.2 | 10.4 | 9.3 | 10.1 | 9.8 |
| $\mu$(0.6) | 29.8 | 30.1 | 30.0 | 29.9 | 29.6 | 29.7 |
| LogR (250° C.) |  |  |  |  | 9.3 | 9.2 |
| LogR (350° C.) |  |  |  |  | 7.5 | 7.4 |
| Liq | 825 | 835 | 885 | 855 | 865 | 855 |
| Visc(P) | 300000 | 250000 | 100000 | 150000 | 160000 | 140000 |
| VISC (Pa.s) | 30000 | 25000 | 10000 | 15000 | 16000 | 14000 |

|  | 7 | 8 | 9 | 10 | 11 | 12 |
|---|---|---|---|---|---|---|
| $SiO_2$ | 62.3 | 61.4 | 62.2 | 63.0 | 63.4 | 62.5 |
| $Al_2O_3$ | 1.0 | 1.0 | 0.1 | 0.1 | 0.1 | 1.0 |
| $K_2O$ | 6.9 | 6.85 | 6.85 | 7.0 | 7.0 | 7.0 |
| $Na_2O$ | 7.35 | 7.5 | 7.45 | 7.6 | 7.7 | 7.7 |
| SrO | 9.7 | 8.7 | 8.7 | 9.7 | 10.2 | 10.2 |
| BaO | 10.15 | 10.9 | 10.9 | 8.9 | 7.9 | 7.9 |
| ZnO | 1.25 | 2.5 | 2.5 | 2.5 | 2.5 | 2.5 |
| CaO | 0 | 0 | 0 | 0 | 0 | 0 |
| $CeO_2$ | 0.3 | 0.3 | 0.3 | 0.3 | 0.3 | 0.3 |
| $TiO_2$ | 0.5 | 0.5 | 0.5 | 0.5 | 0.5 | 0.5 |
| $Sb_2O_3$ | 0.4 | 0.4 | 0.4 | 0.4 | 0.4 | 0.4 |
| $Co_3O_4$ | 0.0018 | 0.0018 | 0.0018 | 0.0018 | 0.0018 | 0.0018 |

TABLE I-continued

|  |  |  |  |  |  |  |
|---|---|---|---|---|---|---|
| NiO | 0.0137 | 0.0137 | 0.0137 | 0.0137 | 0.0137 | 0.0137 |
| Soft | 694 | 691 | 687 | 690 | 688 | 693 |
| Ann | 512 | 508 | 506 | 506 | 504 | 510 |
| Str | 470 | 471 | 466 | 465 | 466 | 471 |
| Exp | 97.7 | 99.1 | 99.6 | 98.6 | 98.7 | 99.1 |
| Dens | 2.777 | 2.807 | 2.797 | 2.770 | 2.768 | 2.770 |
| $\mu(0.3)$ | 9.3 | 10.1 | 10.0 | 9.0 | 8.6 | 8.6 |
| $\mu(0.6)$ | 29.9 | 29.3 | 29.2 | 29.1 | 29.2 | 29.2 |
| LogR (250) | 9.2 | 9.2 | 9.2 | 9.1 | 9.1 | 9.0 |
| LogR (350) | 7.4 | 7.4 | 7.4 | 7.3 | 7.3 | 7.3 |
| Liq | 855 | 835 | 845 | 835 | 790 | 830 |
| Visc(P) | 180000 | 300000 | 200000 | 300000 | 800000 | 350000 |
| Visc (Pa.s) | 18000 | 30000 | 20000 | 30000 | 80000 | 35000 |

|  | 13 | 14 | 15 | 16 | 17 | 18 |
|---|---|---|---|---|---|---|
| $SiO_2$ | 63.5 | 61.4 | 63.4 | 58.6 | 61.45 | 60.75 |
| $Al_2O_3$ | 0.1 | 0.1 | 1.0 | 0.1 | 1.0 | 1.0 |
| $K_2O$ | 7.0 | 6.8 | 7.3 | 6.7 | 8.0 | 8.0 |
| $Na_2O$ | 7.3 | 7.3 | 8.0 | 7.3 | 6.9 | 6.6 |
| SrO | 10.7 | 5.8 | 11.7 | 8.0 | 9.45 | 9.45 |
| BaO | 9.4 | 14.9 | 4.9 | 8.0 | 9.4 | 9.4 |
| ZnO | 0 | 2.5 | 2.5 | 5.0 | 2.5 | 2.5 |
| CaO | 0 | 0 | 0 | 5.0 | 0 | 1.0 |
| $CeO_2$ | 0.3 | 0.3 | 0.3 | 0.3 | 0.4 | 0.4 |
| $TiO_2$ | 0.5 | 0.4 | 0.5 | 0.5 | 0.5 | 0.5 |
| $Sb_2O_3$ | 0.4 | 0.4 | 0.4 | 0.4 | 0.4 | 0.4 |
| $Co_3O_4$ | 0.0018 | 0.0018 | 0.0018 | 0.0018 | 0.00185 | 0.00185 |
| NiO | 0.0137 | 0.0137 | 0.0137 | 0.0137 | 0.01357 | 0.01357 |
| Soft | 692 | 678 | 692 | 707 | 689 | 695 |
| Ann | 506 | 499 | 508 | 531 | 501 | 513 |
| Str | 468 | 461 | 471 | 493 | 459 | 469 |
| Exp | 99.7 | 100.2 | 99.0 | 99.4 | 99.7 | 98.2 |
| Dens | 2.770 | 2.828 | 2.732 | 2.856 | 2.787 | 2.798 |
| $\mu(0.3)$ | 9.3 | 12.1 | 7.1 | 8.5 | 9.4 | 9.4 |
| $\mu(0.6)$ | 28.9 | 27.9 | 29.1 | 29.7 | 29.5 | 29.8 |
| LogR (250) | 9.3 | 9.3 | 8.8 | 9.8 | — | — |
| LogR (350) | 7.5 | 7.4 | 7.1 | 7.9 | — | — |
| Liq | 930 | 955 | 830 | 895 | 865 | 875 |
| Visc(P) | 30000 | 13000 | 350000 | 60000 | 160000 | 140000 |
| Visc (Pa.s) | 3000 | 1300 | 35000 | 6000 | 16000 | 14000 |

Example 17 represents our current preferred embodiment of the present.

It will be observed that at least one constituent in each of Examples 13–16 falls outside the range specified for that constituent. Likewise, at least one property is also outside the prescribed limits. Examples 13–16, therefore, constitute comparison examples. Thus, Example 13 illustrates the effect on the viscosity at the liquidus when ZnO is omitted; Example 14 shows that too high a BaO content has an adverse effect on the viscosity at the liquidus. Example 15 demonstrates that too low a BaO content results in a linear absorption coefficient at 0.3 Angstroms that is too low. Example 16 shows that too much CaO adversely affects the viscosity at the liquidus.

However, a comparison of Examples 17 and 18 shows that a small amount of CaO can be included in the composition without lowering the viscosity at the liquidus beyond acceptable limits.

In order to demonstrate the favorable melting characteristics of the present glasses, comparative melting rates were experimentally determined for five glasses. Two of the glasses were, or have been, commercial glasses used for cathode ray tube faceplate production. The other three are characteristic of our present glass family. The glass compositions are shown below; Examples A and B being the commercial glasses and Examples C, D, and E being from the present glass family. In each case, a glass batch was prepared from standard commercial materials. Each batch was ball milled to provide a fine, homogeneous batch. Approximately 500 grams of batch were then placed in a platinum crucible and a set of four crucibles (one of each glass batch) placed in an electrically heated furnace for melting.

The melting technique was a classic isothermal technique. A set of four melts was made at each of three temperatures (1350°, 1400° and 1450° C.) and for each of three times. The times at 1350° and 1400° were 40, 60 and 80 minutes; whereas the times at 1450° were 20, 30 and 40 minutes. Thus, a total of nine melts of each glass, and an overall total of 45 melts, were made. These melts were compared on the basis of seed counts in terms of seed/in$^3$.

TABLES II and III, below, show, respectively, the calculated compositions of the five glasses, and the seed counts, in seed/in$^3$, made on each melt. The melts are identified by time (Time) in minutes and temperature (Temp.) in ° C.

TABLE II

|  | A | B | C | D | E |
|---|---|---|---|---|---|
| $SiO_2$ | 62.5 | 59.9 | 61.8 | 61.2 | 61.8 |
| $Al_2O_3$ | 2.2 | 2.0 | 1.1 | 0.1 | 1.1 |
| $Na_2O$ | 7.2 | 8.0 | 7.7 | 7.9 | 7.3 |
| $K_2O$ | 8.8 | 7.0 | 6.9 | 7.3 | 6.9 |
| MgO | 0.8 | 0.4 | 0 | 0 | 0 |
| CaO | 1.6 | 1.8 | 0 | 0 | 0 |
| SrO | 10.3 | 8.0 | 9.7 | 6.8 | 9.6 |
| BaO | 2.5 | 8.9 | 9.0 | 8.0 | 10.7 |
| ZnO | 0 | 0 | 2.5 | 7.5 | 1.25 |
| PbO | 2.4 | 0 | 0 | 0 | 0 |
| $CeO_2$ | 0.2 | 0.3 | 0.3 | 0.3 | 0.3 |
| $TiO_2$ | 0.5 | 0.4 | 0.5 | 0.5 | 0.5 |
| $ZrO_2$ | 0 | 2.6 | 0 | 0 | 0 |
| $As_2O_3$ | 0.4 | 0 | 0 | 0 | 0 |

TABLE II-continued

|  | A | B | C | D | E |
|---|---|---|---|---|---|
| $Sb_2O_3$ | 0.5 | 0.5 | 0.5 | 0.4 | 0.5 |
| F | 0.3 | 0 | 0 | 0 | 0 |

TABLE III

| Temp. | 1350° C. | | | 1400° C. | | | 1450° C. | | |
|---|---|---|---|---|---|---|---|---|---|
| Time | 40 | 60 | 80 | 40 | 60 | 80 | 20 | 30 | 40 |
|  | Seeds per cubic inch | | | | | | | | |
| A | >10⁵ | 1412 | 59 | 140 | 13 | <1 | 358 | 4 | 2 |
| B | >10⁵ | 1867 | 712 | 127 | 180 | 25 | 437 | 103 | 13 |
| C | >10⁵ | 1411 | 116 | 171 | 6 | <1 | 47 | 13 | <1 |
| D | 52 | 71 | 63 | 13 | 9 | <1 | 2 | 4 | 1 |
| E | >10⁵ | — | — | 28 | 4 | <1 | <1 | — | — |

It is readily apparent that the fining rate of the present glasses, a measure of melting ease, is generally comparable to that of glass A which contains lead oxide and fluorine. Likewise, it is equally evident that present glasses are much easier to melt than glass B, wherein lead oxide and fluorine are omitted, and $ZrO_2 + BaO + SrO$ are relied on for X-radiation absorption.

A comparison was made of the electron "browning" of a commercial zinc-free television glass sample F and one of our compositions G containing 2.5 weight percent ZnO.

In order to obtain quantitative measurements, a JEOL Superprobe 733 supplied the electron beam. The electron microprobe was set up to run at 20 kV and 200 nA, with the magnification of the sample at 540×, the beam focused, the secondary electron image collector set at zero, and the scan generator set up to raster slowly [the coarse setting at 3, and the horizontal and vertical both at 9]. The framed area, 0.3 mm by 0.2 mm, was rastered five times; each raster took 10 minutes to complete.

The dosage given to the samples in the way described above was more than sufficient to cause a visible and measurable darkening of the glass within the exposed area.

Because the rastered area was small, a Nikon optical microscope was used to view the area at a magnification that caused the darkened area to fill the viewed image. A photometer attached to the microscope was used to calculate the optical density of the exposed area.

Before measuring the optical densities due to electron bombardment, the samples were thermally annealed at 300° C. for one hour to bleach the X-ray "browning".

The compositions of the glasses follow:

|  | F | G |
|---|---|---|
| $SiO_2$ | 59.3 | 61.5 |
| $Al_2O_3$ | 2.3 | 2.0 |
| $Na_2O$ | 8.1 | 6.2 |
| $K_2O$ | 7.0 | 7.6 |
| MgO | 0.6 | 0 |
| CaO | 2.0 | 0 |
| SrO | 8.0 | 9.4 |
| BaO | 8.9 | 9.4 |
| ZnO | 0 | 2.5 |
| $TiO_2$ | 0.4 | 0.5 |
| $CeO_2$ | 0.4 | 0.4 |
| $ZrO_2$ | 2.4 | 0 |
| $SB_2O_3$ | 0.3 | 0.4 |
| $Co_3O_4$ | * | 0.0018 |
| NiO | * | 0.0137 |

*Present, but not analyzed

The optical density (as measured above) due to electron bombardment of both these samples was 0.13, showing that the presence of 2.5 weight percent ZnO did not affect the electron "browning".

We claim:

1. A glass essentially free from fluorine and the oxides of lead, arsenic and zirconium which exhibits linear X-radiation absorption coefficients of at least 28 cm⁻¹ at a wavelength of 0.6 Angstroms and at least 8.5 cm⁻¹ at 0.3 Angstroms, undergoes essentially no "browning" discoloration when subjected to high velocity electrons, has a viscosity at the internal liquidus of at least 100,000 poises (10,000 Pa.s), has a coefficient of thermal expansion (25°-300° C.) in the range of 97-100×10⁻⁷/° C., has an annealing point not lower than about 500° C. and a strain point not lower than about 455° C., has an electrical resistivity, expressed as log R at 250° C. greater than 9 and at 350° C. greater than 7, the glass consisting essentially, expressed in terms of weight percent on an oxide basis, of

| $SiO_2$ | 60-65 | SrO | 8-12 |
|---|---|---|---|
| $Al_2O_3$ | 0-3 | BaO | 8-12 |
| $Na_2O$ | 6.5-8 | BaO + SrO | 16-21 |
| $K_2O$ | 6.5-10 | ZnO | 1-8 |
| CaO + MgO | 0-3 | $CeO_2$ | 0.1-1 |
| $Sb_2O_3$ | 0.1-1 | $TiO_2$ | 0.1-1. |

2. A glass in accordance with claim 1 wherein the ZnO content is not over 2.5%.

3. A glass in accordance with claim 1 wherein the glass contains not more than about 2% $Al_2O_3$.

4. A glass in accordance with claim 1 containing about 0.4% $CeO_2$ and 0.5% $TiO_2$.

5. A glass in accordance with claim 1 which further contains at least one colorant oxide selected from the group, consisting of $Co_3O_4$, $Cr_2O_3$ and NiO.

6. A cathode ray tube faceplate formed from a glass essentially free from fluorine and the oxides of lead, arsenic and zirconium which exhibits linear X-radiation absorption coefficients of at least 28 cm⁻¹ at a wavelength of 0.6 Angstroms and at least 8.5 cm⁻¹ at 0.3 Angstroms, undergoes essentially no "browning" discoloration when subjected to high velocity electrons, has a viscosity at the internal liquidus of at least 100,000 poises (10,000 Pa.s), has a coefficient of thermal expansion (25°-300° C.) in the range of 97-100×10⁻⁷/° C., has an annealing point not lower than about 500° C. and a strain point not lower than about 455° C., has an electrical resistivity, expressed as log R that is greater than 9 at 250° C. and greater than 7 at 350° C., the glass consisting essentially, expressed in terms of weight percent on an oxide basis, of

| $SiO_2$ | 60-65 | SrO | 8-12 |
|---|---|---|---|
| $Al_2O_3$ | 0-3 | BaO | 8-12 |
| $Na_2O$ | 6.5-8 | BaO + SrO | 16-21 |
| $K_2O$ | 6.5-10 | ZnO | 1-8 |
| CaO + MgO | 0-3 | $CeO_2$ | 0.1-1 |
| $Sb_2O_3$ | 0.1-1 | $TiO_2$ | 0.1-1. |

7. A cathode ray tube faceplate in accordance with claim 6 wherein the glass contains not over 2.5% ZnO.

8. A cathode ray tube faceplate in accordance with claim 6 wherein the glass contains no more than about 2% $Al_2O_3$.

9. A cathode ray tube faceplate in accordance with claim 6 wherein the glass contains about 0.4% $CeO_2$ and about 0.5% $TiO_2$.

10. A cathode ray tube faceplate in accordance with claim 6 wherein the glass contains at least one colorant oxide selected from the group, consisting of $Co_3O_4$, $Cr_2O_3$ and NiO.

* * * * *